May 25, 1965  O. H. FLATTEN  3,185,858
BI-DIRECTIONAL CONSTANT CURRENT DEVICE
Filed July 8, 1959  5 Sheets-Sheet 1

INVENTOR.
ORRIS H. FLATTEN
BY
AGENT

May 25, 1965   O. H. FLATTEN   3,185,858
BI-DIRECTIONAL CONSTANT CURRENT DEVICE
Filed July 8, 1959   5 Sheets-Sheet 2
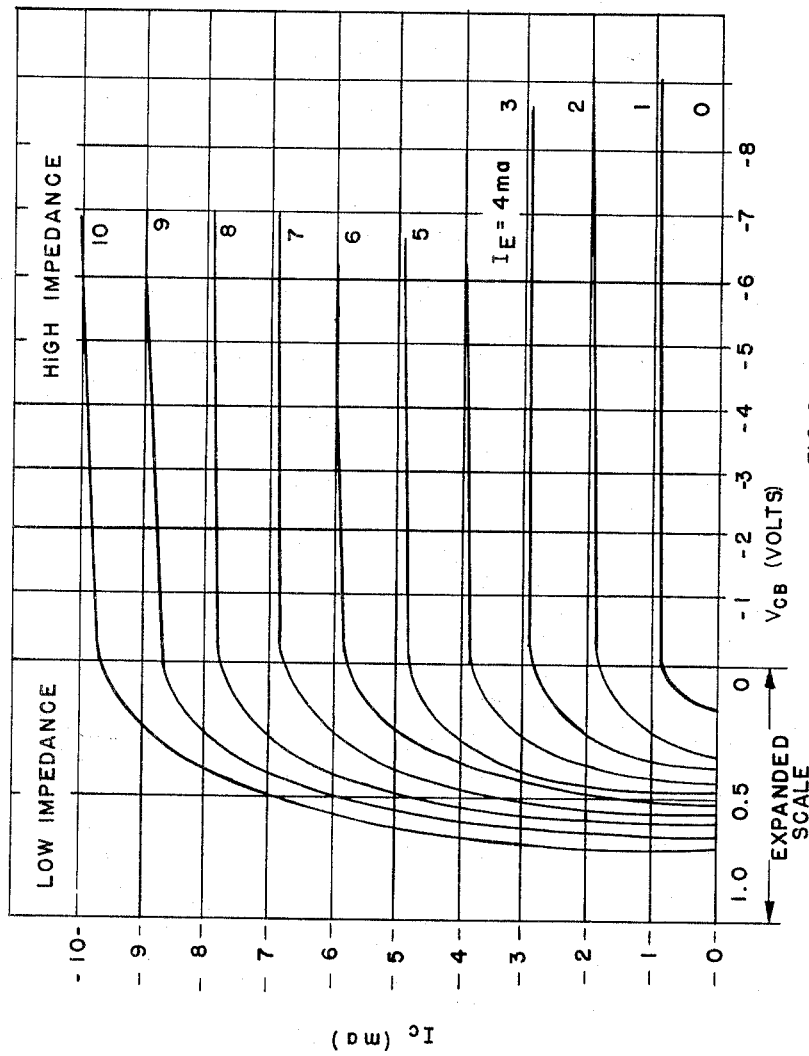
INVENTOR.
ORRIS H. FLATTEN
BY
AGENT May 25, 1965

O. H. FLATTEN 3,185,858

BI-DIRECTIONAL CONSTANT CURRENT DEVICE

Filed July 8, 1959

INVENTOR.
ORRIS H. FLATTEN

BY

*Louis J. Knobbe*

AGENT

May 25, 1965  O. H. FLATTEN  3,185,858
BI-DIRECTIONAL CONSTANT CURRENT DEVICE
Filed July 8, 1959  5 Sheets-Sheet 5

INVENTOR.
ORRIS H. FLATTEN
BY
AGENT

United States Patent Office 3,185,858
Patented May 25, 1965

3,185,858
BI-DIRECTIONAL CONSTANT CURRENT DEVICE
Orris H. Flatten, Fullerton, Calif., assignor to
North American Aviation, Inc.
Filed July 8, 1959, Ser. No. 825,775
19 Claims. (Cl. 307—88.5)

This invention relates to a constant current device and particularly to a device providing constant current for opposite directions of current flow.

This invention provides a device for limiting the current in an isolated location to any predetermined value. The current level may be controlled separately in each direction of current flow. This type of circuitry has utility in several fields, two examples being precision tachometer circuits and computers employing pulsed signals.

A device known in the prior art for so limiting bi-directional current flow utilized saturable reactors. Reactors are difficult to adjust, produce a poor waveform, are subject to harmful effects from vibration and have induced potentials from external magnetic fields.

Accordingly, it is an object of the present invention to provide a device which automatically supplies a constant current to a load in both directions of current flow irrespective of changes in supply voltage or the load impedance.

It is another object of this invention to provide an improved precision tachometer.

It is still another object of this invention to provide an improved clamping circuit for controlling the current magnitudes of both positive and negative signals.

A further object of this invention is to provide a bi-directional constant current device which is easy to adjust.

It is another object of this invention to provide a bi-directional constant current device which has a good output signal waveform.

It is still another object of this invention to provide a bi-directional constant current device which resists vibration.

A further object of this invention is to provide a bi-directional constant current device which is not subject to induced potentials from external magnetic fields.

It is another object of this invention to provide a constant current device which introduces a very low residual potential into the circuit.

Briefly, in accordance with a preferred form of the present invention, a bi-directional constant current device includes a pair of transistors series connected with the load and energy source. The transistors are biased so as to deliver a constant collector current for collector current in one direction. For collector current in the opposite direction, the transistors appear as low impedances. By suitable connections hereinafter described, each transistor controls the current level for an opposite flow of current. When not providing a constant current, the transistors appear as low impedances in the circuit. Thus, for each direction of current flow one transistor prevents the current from exceeding a predetermined maximum while the other transistor appears as a low impedance for current flow therethrough.

A more thorough understanding of the invention may be obtained by a study of the following detailed description taken in connection with the accompanying drawings in which:

FIG. 2 illustrates the output characteristics of a p-n-p transistor connected in a common-base circuit;

Figure 1:
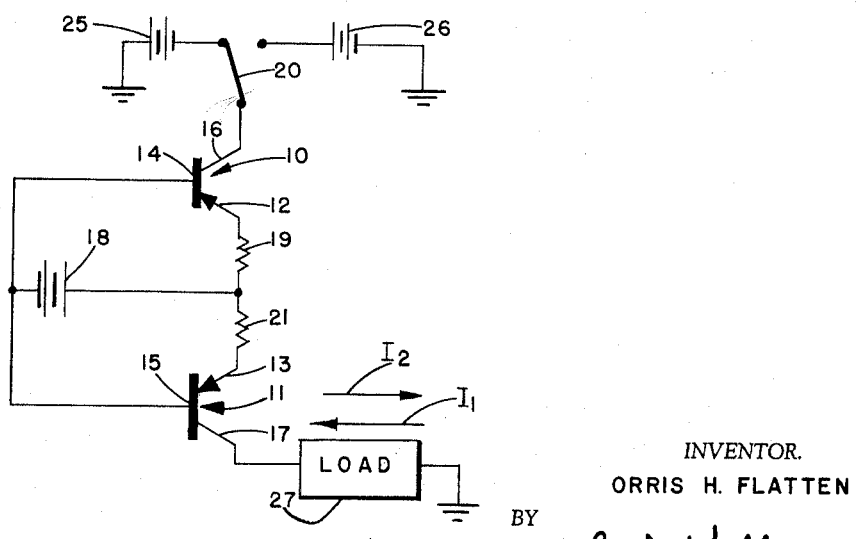
FIG. 1 illustrates schematically one embodiment of this invention.

Referring now to FIG. 1, p-n-p transistors 10 and 11 have respective emitter electrodes 12 and 13, base electrodes 14 and 15 and collector electrodes 16 and 17. Although p-n-p transistors are illustrated, the present invention is not limited to this particular type of transistor. For transistors of the n-p-n type, which have forward emitter and reverse collector current flow in the opposite direction, the circuitry is the same except that the polarities of the direct current supply sources are reversed.

The emitter electrodes 12 and 13 are respectively connected to terminals of resistors 19 and 21. The other terminals of the resistors 19 and 21 are connected together and to the positive terminal of biasing battery 18. The base to emitter biasing circuit is completed by connecting the negative terminal of battery 18 to each of the base electrodes 14 and 15. The collector electrode 16 of transistor 10 is shown connected to a single pole-double throw switch 20 adapted for communicating with potential sources of opposite polarity represented as battery 25 and battery 26. The collector electrode 17 of transistor 11 is connected to ground through the load 27. Transistors 10 and 11 are thereby connected in a common-base configuration.

The desired operation of the circuit of FIG. 1 is to provide a constant current flow through load 27 in both directions of current flow represented as currents $I_1$ and $I_2$. The description of the operation of this circuit may be aided by first referring to a characteristic curve for the transistors 10 and 11 in a common-base circuit, as shown in FIG. 2. The collector current in FIG. 2 is plotted on the ordinate and the collector bias between the collector and base of the transistor ($V_{CB}$) is plotted on the abscissa. It may be noted that the transistor for constant values of emitter current has two distinct modes of operation occurring between opposite polarities of collector bias. In FIG. 2, these regions are denoted as a low impedance region and a high impedance region. In the latter high impedance region, the collector is made negative with respect to the base. When so biased, the collector to base diode of the transistor is reversed biased which is, of course, the normal operating condition of a transistor. The transistor in this region offers a very high resistance to current variations and as shown in the figure, the collector current is substantially independent of the collector bias so long as the collector bias remains of negative polarity. This region is therefore characterized by minute current changes in relation to substantial voltage changes or, i.e., a region of high dynamic resistance. By transistor action, the collector current in this region is approximately equal to the negative of the emitter current times the $\alpha$ of the transistor or $$I_C = -\alpha I_E \qquad (1)$$

However, at or near zero potential upon the collector, substantial current changes are caused by minute voltage changes. An expanded scale is used in this region so as to more clearly show the transistor action. This region of forward collector to base bias is thus characterized by a very small dynamic resistance. This invention employs these two pronounced operating regions in a unique manner to provide a bi-directional constant current circuit.

The operation of the circuit of FIG. 1 is as follows: emitter bias supply comprising battery 18 and resistors 19 and 21 biases the emitter to base junctions of both transistors 10 and 11 so as to set the constant collector current level at the desired magnitude. For the p-n-p type transistor as shown, the emitter is made more positive than its base. Switch 20 adjusts the operating bias upon the collector electrode 16 of transistor 10 and the collector electrode 17 of transistor 11. For example, if the switch is in the position shown, namely connected to a source of negative potential, the collector electrode 16 is biased negatively with respect to its base electrode 14 so that the transistor 10 is in the operating region denoted as the high impedance region in FIG. 2. Therefore, the collector current flow through transistor 10 will be substantially constant and independent of load variations. The base electrodes 14 and 15 are at a potential somewhat positive with respect to the collector electrode 16. However, collector electrode 17 which is tied to ground through load 27 and thus to the positive terminal of battery 25 will be at a higher relative potential than base electrode 15. Thus, transistor 11 is biased so that the collector to base junction of transistor 11 is forwardly biased which, as noted above and shown in FIG. 2, operates the transistor in a low impedance region. Thus, the load current $I_1$ flows unimpeded through transistor 11 and is controlled in magnitude by transistor 10.

For load currents of opposite flow shown in FIG. 1 as $I_2$, switch 20 is thrown so as to connect battery 26 in circuit instead of battery 25. In this case, the collector electrode 16 is positively biased with respect to the base electrode 14 thereby biasing transistor 10 in what is termed the low impedance region. Base electrodes 14 and 15 are now somewhat negatively biased with respect to collector electrode 16. Collector electrode 17 is more negatively biased than is the base electrode 15 since the collector electrode is connected to ground through the load 27 to the negative terminal of battery 26. Transistor 11 is therefore biased in what is termed the high impedance state in which the collector current flow is substantially constant irrespective of changes on the collector load. It will thus be seen that for the load current $I_2$, the roles of transistors 10 and 11 are reversed; namely transistor 11 maintains a constant current flow while transistor 10 appears as a relatively small impedance in the circuit. Thus, the transistors, as connected, effectively serve to bias each other in the respectively opposite state when the potential upon one or other of the collector electrodes is changed.

Figure 3:
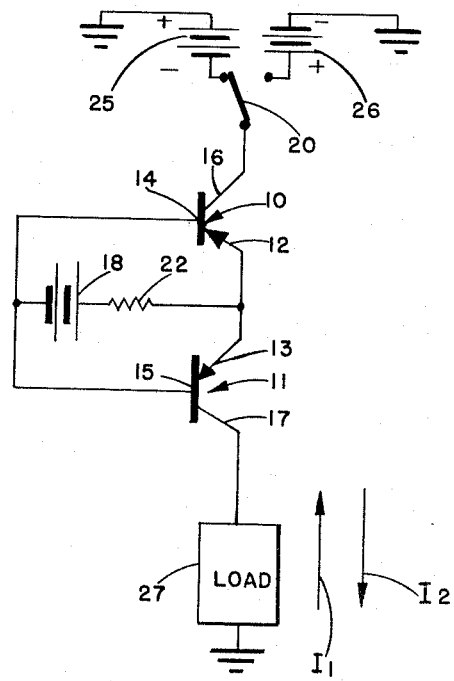
FIG. 3 illustrates schematically another embodiment of this invention.

Another embodiment of this invention shown in FIG. 3 operates the transistors in a common-emitter and common-base configuration. For convenience those components which may be identical to those previously shown in FIG. 1 bear the same identification numerals.

Referring to FIG. 3, the emitter electrodes 12 and 13 of the respective transistors are connected together and to a biasing supply comprising resistor 22 connected to positive terminal of battery 18. The base to emitter biasing circuit is completed by connecting the negative terminal of battery 18 to each of the base electrodes 14 and 15. The collector electrode 16 of transistor 10 is shown connected to a single pole-double throw switch 20 adapted for communicating with potential sources of opposite polarity represented as battery 25 and battery 26. The collector electrode 17 of transistor 11 is connected to ground through the load 27.

Figure 4:
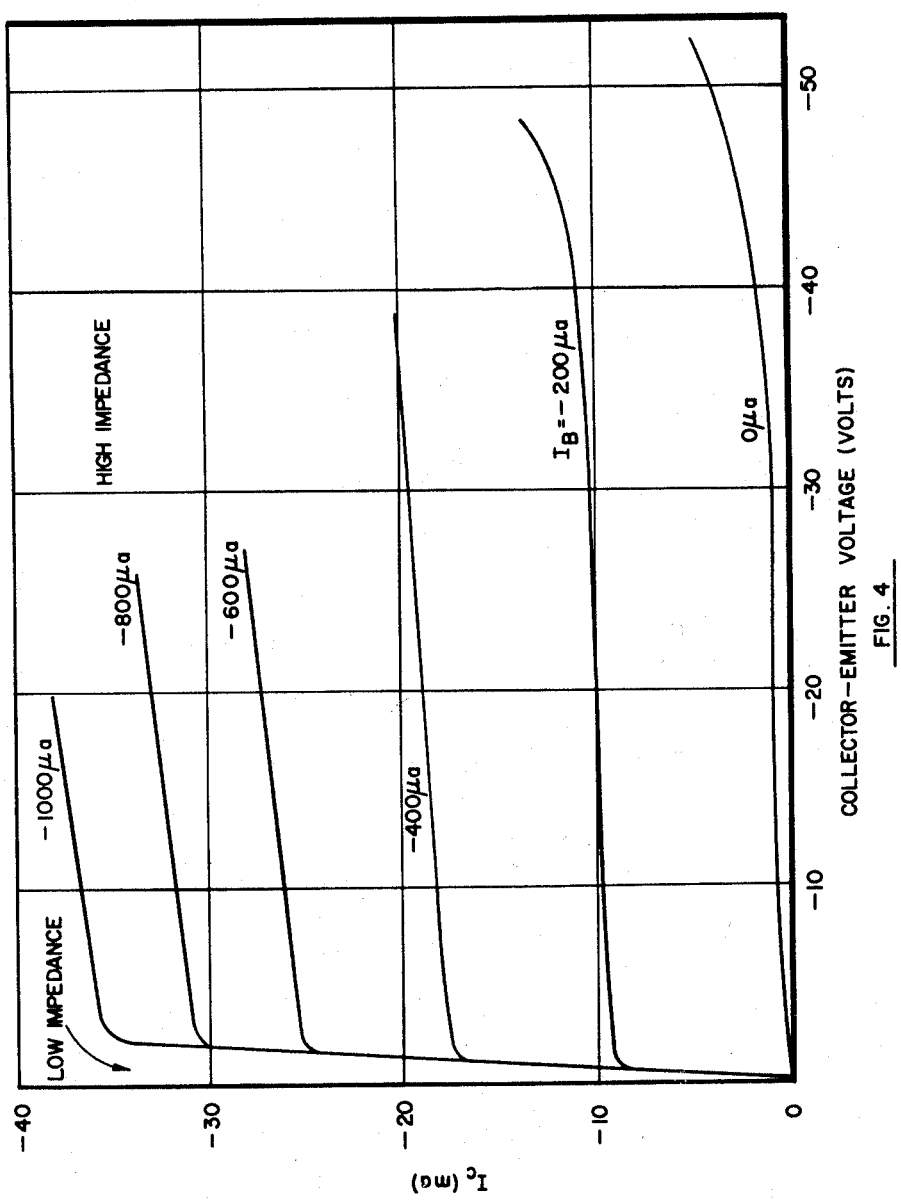
FIG. 4 illustrates the output characteristics of p-n-p transistor connected in a common-emitter circuit.

The characteristics of a typical p-n-p transistor connected in a common-emitter circuit is shown in FIG. 4. It will be noted that the output characteristics of a common-emitter stage are quite similar to the common-base connection, i.e., the transistor may operate in both a high impedance and low impedance region. The primary difference between the two connections are that in the common emitter, the collector to base junction need not be reverse biased in order that the transistor operate in a region of low impedance.

The operation of the circuit of FIG. 3 is therefore quite similar to that of the circuit of FIG. 1. The base to emitter bias supply comprising battery 18 and resistor 22 provides the proper base current in both transistors 10 and 11 so as to set the constant collector current level at the desired magnitude. For p-n-p transistors as shown, the base is made more negative than the emitter electrode. Switch 20 adjusts the operating bias upon the collector electrode 16 of transistor 10 and the collector electrode 17 of transistor 11. For example, if the switch is in the position shown, namely connected to a source of negative potential, the collector electrode 16 is biased negatively with respect to its emitter electrode 14 so that the transistor 10 is in the operating region denoted as the high impedance region in FIG. 4. Therefore, the collector current flow through transistor 10 will be substantially constant and independent of load variations. Collector electrode 17 of transistor 11 is tied to ground through load 27 to the positive terminal of battery 25; the collector electrode is therefore biased positively with respect to the emitter electrode 13. Transistor 11 is then biased to operate in a low impedance region. Thus, the load current $I_1$ flows unimpeded through transistor 11 and is controlled in magnitude by transistor 10.

For load currents of opposite flow shown in FIG. 3 as $I_2$, switch 20 is thrown so as to connect battery 26 in circuit instead of battery 25. In this case, the collector electrode 16 is positively biased with respect to the emitter electrode 12 thereby biasing transistor 10 in what is termed the low impedance region. In transistor 11, collector electrode 17 is more negatively biased than emitter electrode 13 since the collector electrode is connected to ground through the load 27 to the negative terminal of battery 26. Transistor 11 is therefore biased in what is termed the high impedance state in which the collector current flow is substantially constant irrespective of changes on the collector load. It will thus be seen that for the load current $I_2$, the roles of transistors 10 and 11 are reversed; namely transistor 11 maintains a constant current flow while transistor 10 appears as a relatively small impedance in the circuit.

Figure 5:
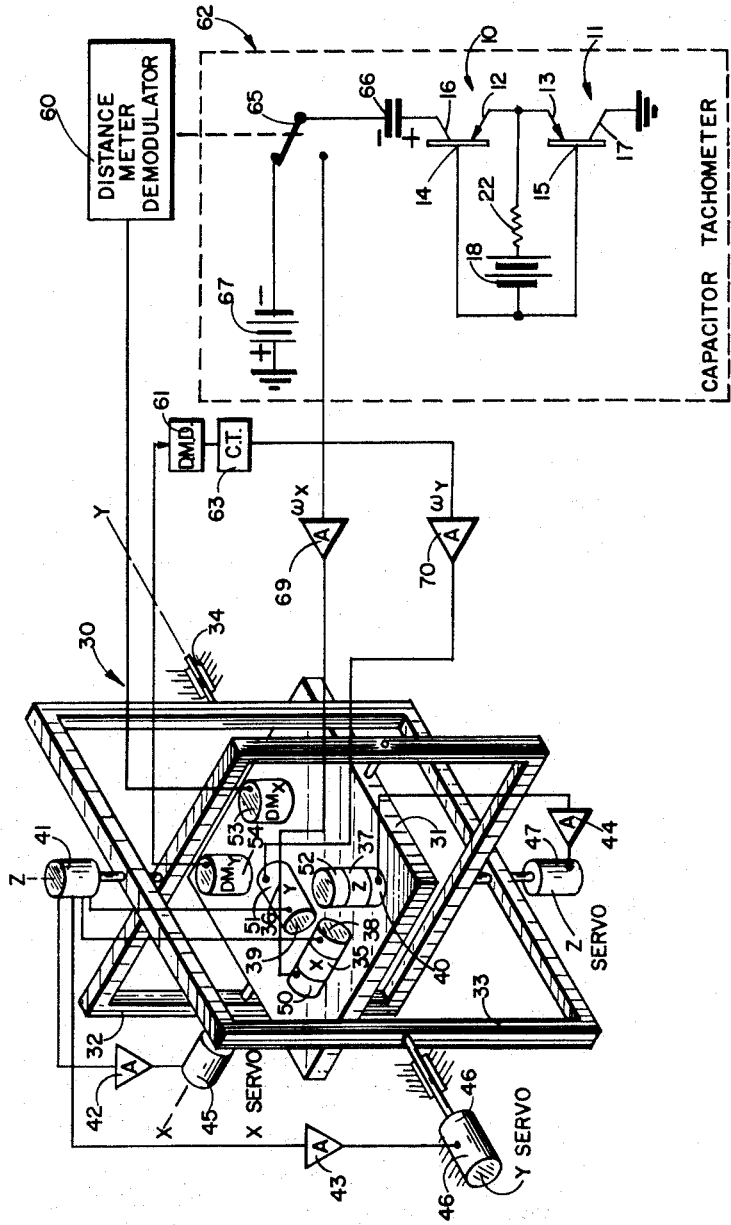
FIG. 5 illustrates schematically an inertial platform including a precision tachometer circuit which incorporates this invention.

An application in which this invention has particular utility is in precision tachometer circuits used for supplying gyroscope torquer coils with a predetermined precise amount of current. This application is illustrated in FIG. 5 which shows a typical three axis stable platform. This general type of platform is shown, for example, in an article entitled "Inertial Navigation" by J. M. Slater and D. B. Duncan and published in Aeronautical Engineering Review, January 1956 on page 49. The autonavigator shown in FIG. 5 comprises a stable platform 30 including a frame or support 31 pivoted about the X axis in an inner-gimbal 32 which is pivoted about the Z axis in an outer-gimbal 33. Gimbal 33 is pivoted about the Y axis to a fixed frame or support 34 which may comprise any suitable structural element of the guided vehicle or other structure rigidly affixed thereto. The axes X, Y and Z are mutually orthogonal. The frame 31 carries a set of conventional gyroscopes 35, 36, and 37 which may be single axis or single degree of freedom gyroscopes having the sensing or input axes thereof respectively aligned along the X, Y and Z axes. The gyroscopes embody conventional pickoffs 38, 39 and 40, which provide signals indicative of the input axis torques on the gyroscopes and are fed via azimuth resolver 41 and through amplifier demodulators 42, 43 and 44 to gimbal servomotors 45, 46 and 47. Thus, the Z axis gyro 37 senses a torque tending to displace the platform 31 about the Z axis and feeds an appropriate signal to the Z axis servomotor 47 which torques the platform (by torquing gimbal 32 relative to gimbal 33) about the Z axis in a sense to diminish the Z axis torque detected by the gyro 37. Similarly, the gyros 35 and 36 detect torques tending to displace the platform 31 about the gyro input axes and, via resolver 41, feed signals indicative of the X and Y components of such torques to the X and Y servomotors 45, 46 which torque the platform in a sense to diminish the input axis torques detected by the gyros 35 and 36.

The gyros 35, 36 and 37 are each provided with conventional torquers 50, 51 and 52 which apply torques about the output axis of the gyro such as to precess each gyro about its input axis at a rate sufficient to maintain a selected orientation, such as local earth level of the platform. A typical gyroscope embodying an output axis torquer is described in a patent application entitled "Flotation Gyroscope," Serial No. 259,192, filed November 30, 1951, by John M. Slater et al. and assigned to North American Aviation, Inc., assignee of the present invention.

The platform 31 also mounts a pair of conventional distance meters 53 and 54 having mutually orthogonal sensing axes directed along the X and Y axes respectively. Inertial distance meters are known in the art, an example being shown in patent application, Serial No. 536,686, entitled "Improved Accelerometer and Integrator" filed September 23, 1955, by J. M. Wuerth et al. and assigned to North American Aviation, Inc., assignee of the present invention. This inertial distance meter includes a rotor which rotates at a speed indicative of the speed at which the guided vehicle is traveling and the number of rotations thereof indicating the distance traveled by the vehicle. In order to count the number of rotations and determine the speed at which the rotor is rotating, a resolver is commonly mounted on the rotor shaft which provides an electrical output from the distance meter indicating the rotation of the distance meter rotor. This resolver signal is commonly a suppressed carrier signal. In the usual type of gyroscope torquer, this type of signal is not appropriate for direct application to the torquer. Accordingly, distance meter demodulators 60 and 61 are respectively connected to the outputs of distance meters 53 and 54. These demodulators convert the resolver signal from the associated distance meter into a pulse signal indicating the distance traveled. For example, the demodulator may provide a predetermined number of pulses for a predetermined number of feet traveled by the vehicle in the respective X and Y directions. This pulse output is then used to supply a current of predetermined magnitude and duration to the gyroscope torquer for each pulse thereby precisely precessing the gyro the required amount to maintain the platform for example at local earth level.

A common device for so translating the pulse into a predetermined current magnitude is the capacitor tachometer. Shown schematically in FIG. 5 at 62 is a unique capacitor tachometer incorporating the hereinbefore described circuitry. A second capacitor tachometer 63 shown in block diagram is used to couple the distance meter demodulator 61 to the torquer of the Y axis gyroscope.

Capacitor tachometer 62 includes rate relay switch 65 used in the charging and discharging of capacitor 66. This relay switch is operated in accordance with the pulse signals from the distance meter resolver signal demodulator. The rate relay 65 connects capacitor 66 first to battery 67 for charging and then to the summing amplifier 69 for discharging. A similar summing amplifier 70 couples capacitor tachometer 63 to the torquer of the Y axes gyroscope 36. By fully charging and discharging the capacitor each time, a current pulse of constant area is supplied to the gyro torquer for each output pulse of the distance meter demodulator.

In the capacitor tachometer shown, some means must be provided for limiting the peak current in both the charging and discharging circuits. In both the charging and discharge circuit, high peak currents burn the relay contacts. Also, in the discharge circuit, high peak currents adversely affect the summing amplifier 69 and torquer of the gyroscope 35. One means for affording a limitation on the peak current is to insert resistors in the charging and discharging circuits. These resistors are objectionable however in that they lengthen the time constant of the circuit. The capacitor 66 will then not be fully discharged on each pulse at the higher distance meter speeds.

The present invention in combination with the capacitor tachometer provides a satisfactory solution for this problem. The bi-directional constant current circuit shown in FIG. 3 and described hereinbefore is connected in series with capacitor 66 and ground as shown in FIG. 5. In operation, switch 65 initially connects capacitor 66 to the negative battery 67. Therefore, the collector electrode 16 of transistor 10 is connected through capacitor 66 to a negative bias. Battery 18 and resistor 19 supply the base bias for both transistors 10 and 11. The operation of the circuit is the same as described above; thus a negative potential applied to collector electrode 16 biases transistor 10 into the hereinbefore denoted high impedance region wherein the collector current is determined only by the current flow in the base and the transistor characteristics. During this time the collector junction of transistor 11 is forwardly biased and will readily pass a large amount of current. With the negative battery 67 in circuit, the capacitor stores an electric charge equal to the time integral of the current into the capacitor and with the potential polarity shown. When rate relay switch 65 is switched to connect the capacitor in circuit with the torquer coil of gyroscope 35, the circuit appears as though a battery of the potential and polarity of the charged capacitor has been connected in series with capacitor 66 and current flows in a direction opposite that of the charging current flow. The collector electrode 16 is then connected to a source of positive potential through amplifier 69 and the torquer coil of gyroscope 35 to ground. Collector electrode 16 is therefore positively biased with respect to emitter electrode 12. Since the collector junction of transistor 10 is forwardly biased, it will readily pass a large amount of current and appear as a low impedance in the circuit. Collector electrode 17 of transistor 11 is tied to ground and therefore is at a lower potential than emitter electrode 13. Since the collector junction of transistor 11 is reverse biased, the collector current flow in transistor 11 is substantially constant dependent only upon the current flow in its base and the transistor characteristics. The operation of the device may thus be summarized as follows: During the period that the capacitor 66 is discharging, transistor 11 serves to limit the peak current for protection of the torquer of gyroscope 35, amplifier 69 and the contacts of switch 65. During the period that the capacitor 66 is charging, transistor 10 serves to limit the peak currents for the protection of the contacts of switch 65.

A further advantage of my invention is of particular utility in the capacitor tachometer application. It is essential that the area of the torquing pulse remain the same, i.e., it is necessary that all of the charge on capacitor 66 be transferred to the torquer coil of gyroscope 35 during the discharge period. As the charge on the capacitor 66 decreases, the potential across the capacitor becomes lowered until the collector to emitter junction of transistor 11 approaches a very low potential. At this point, the transistor 11 is no longer biased in its constant current region, but rather, as shown in FIG. 4, the transistor abruptly changes to a low impedance device which readily passes current. Therefore, all of the charge upon capacitor 66 is readily transferred to the torquer of gyroscope 35.

Still another advantage of the circuit of FIG. 3 incorporated in a capacitor tachometer is that an extremely low residual potential remains after the capacitor has been completely discharged. It is essential that only the charge upon the capacitor 66 be transferred to the torquer coil of the gyroscope, i.e., the circuit must be void of additional potential sources. However, a single transistor stage such as transistor 11 will appear as a small battery in the circuit because of the emitter bias applied thereto. However, since two transistor circuits are used with their emitter electrodes 12 and 13 connected back to back, the small voltages contributed by each will oppose each other thereby effectively eliminating the effects of the potential sources which would otherwise be contributed by each transistor circuit.

Figure 6:
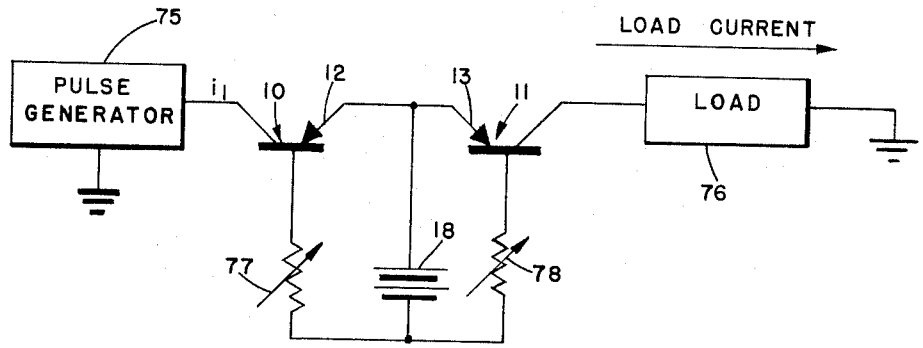
FIG. 6 illustrates schematically this invention as a computer clamping circuit for achieving bi-polarity current pulses of a constant amplitude.

Another use of my invention is in computer circuits requiring positive and negative pulses of a substantially fixed magnitude. This type of application is shown in FIG. 6 wherein a clamping circuit, including transistors 10 and 11 connected in series as above, is in series circuit with a pulse generator 75 and load 76. The base to emitter bias circuit for transistors 10 and 11 retains a single battery 18 having its positive terminal connected to the common junction of emitter electrodes 12 and 13. However, a pair of biasing resistances are used comprising variable resistor 77 and variable resistor 78. Each resistor is connected to a respective base electrode of one of the transistors and to the negative terminal of battery 18.

This connection affords a control over the base bias of each transistor independent that of the other thereby enabling each transistor to operate on a different one of the curves hereinbefore shown in FIG. 4. This bias circuitry may also be desirable for the circuits hereinbefore shown when equal current magnitudes are desired for both directions of load current flow since any variations between the two transistors may be compensated for by suitable adjustment of resistors 77 and 78.

Figure 7:
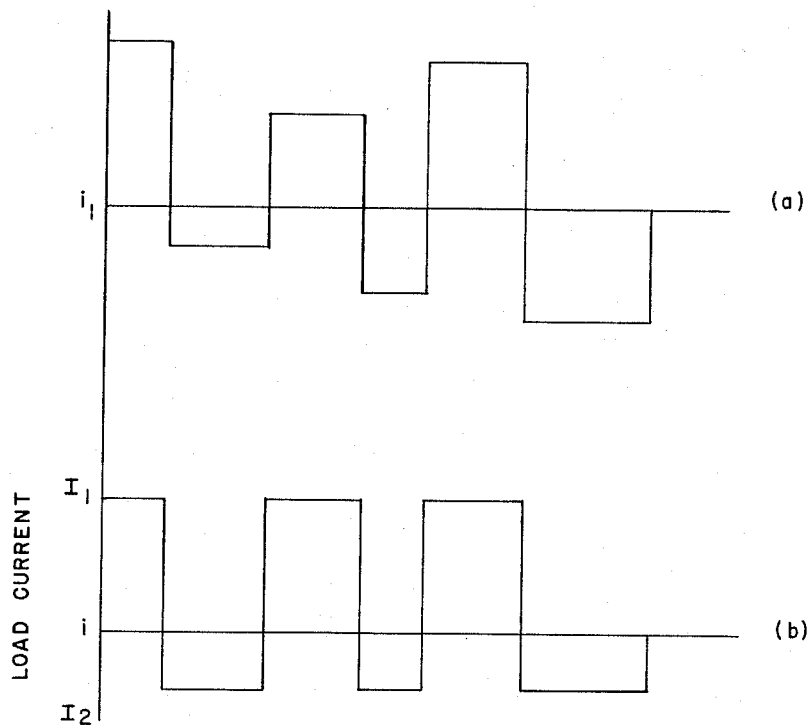
FIG. 7 illustrates the input and output wave forms of the circuit shown in FIG. 6.

The operation of the system of FIG. 6 is illustrated in FIGS. 7a and 7b. In FIG. 7a are shown the pulse outputs from pulse generator 75 which may vary both in current magnitude and in pulse length. The desired load current pulses are shown in FIG. 7b as having constant amplitudes in both the positive and negative directions and selectively different magnitudes in both directions. The operation of this clamping circuit is substantially identical to the operation of the circuitry hereinbefore described. Thus, for the positive initial pulse shown in FIG. 7a, the collector junction of transistor 10 is forwardly biased and the transistor readily passes a large amount of current. The collector junction of transistor 11 is reversed biased with this positive pulse and the collector current flow through transistor 11 is determined by the current flow in the base which in turn may be changed by variable resistance 78. For negative pulses, the reverse condition holds with transistor 10 having a collector current flow determined by the variable resistance 77. The desired output shown in FIG. 7b is thereby achieved since the output current pulse widths vary according to the widths of the input pulses and the output current pulse magnitudes are maintained constant at levels determined by the variable resistances 77 and 78 and independent of the magnitudes of the input pulses.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A circuit for providing predetermined levels of current for opposite directions of current flow in a load comprising input terminals adapted for connection to an energy source; first and second variable impedance devices; means for connecting said input terminals, said first and second variable impedance devices and said load in a common current path; direct current biasing means coupled to said first and second variable impedance devices for causing one of said devices to operate in a state of high impedance and for causing the other of said devices to operate in a state of low impedance depending upon the direction current is being driven through said common current path by the energy source coupled to said input terminals; said biasing means causing the device in its high impedance state to act as a current-limiting device.

2. A circuit for providing predetermined levels of current for opposite directions of current flow in a load comprising input terminals adapted for connection to an energy source; first and second variable impedance devices; biasing means coupled to said first and second variable impedance devices of such magnitude and polarity that the current through said devices in either direction is limited to a predetermined maximum value; one of said devices being characterized as a high impedance device for current flow in a first direction and as a low impedance device for current flow in a second direction opposite that of said first direction; the other of said devices being characterized as a high impedance device for current flow in said second direction and as a low impedance device for current flow in said first direction; means for connecting said first and second variable impedance devices so that current flow causing one of said devices to operate as a high impedance causes the other of said devices to operate as a low impedance; and means providing a common current path through said input terminals, said first and second variable impedance devices and said load.

3. A circuit for providing predetermined levels of current for opposite directions of current flow in a load comprising input means adapted for connection to an energy source; first and second variable impedance devices each having a current-emissive electrode, a current-receiving electrode, and control electrode for current passing between said current-emissive and current-receiving electrodes; said first and second variable impedance devices each being operable in regions of high and low impedance between said current-receiving electrode and one of said other electrodes under proper conditions of electrode bias; biasing means connected between the control electrode and current-emissive electrode of each of said first and second variable impedance devices for causing respective said devices to operate in said regions of high and low impedance respectively for opposite directions of current flow through said current-receiving electrode; means connecting said input means to the current-receiving electrode of said first variable impedance device; means connecting said load to the current-receiving electrode of said second variable impedance device; and means connecting together said first and second variable impedance devices so that current flow causing one of said devices to operate as a high impedance causes the other of said devices to operate as a low impedance.

4. A circuit for providing predetermined levels of current for opposite directions of current flow in a load comprising energy means for causing current flow in opposite directions through said load; first and second transistors each having emitter, collector and base electrodes; said transistors being characterized by a region of low impedance and a region of high impedance between said collector electrode and one of said other electrodes for respectively opposite current flow through said collector electrode; bias means connected between said emitter and base electrodes of each of said transistors for establishing a predetermined constant collector current flow for said high impedance region; means connecting said energy means to the collector electrode of said first transistor; means connecting said load to the collector electrode of said second transistor; said bias means causing one of said transistors to operate as a high impedance and causing the other of said transistors to operate as a low impedance.

5. The circuit defined in claim 4 wherein said bias means comprises a source of energy having a pair of terminals, a first two-terminal resistive network having one terminal connected to the emitter electrode of said first transistor and the other terminal connected to one terminal of said energy source, a second two-terminal resistive network having one terminal connected to the emitter electrode of said second transistor and the other terminal connected to the said one terminal of said energy source, and the other terminal of said energy source being connected to the base electrodes of said first and second transistors.

6. The circuit defined in claim 4 wherein said bias means comprises a source of energy having a pair of terminals, a two-terminal resistive network having one terminal connected to the emitter electrodes of said first and second transistors and the other terminal connected to one terminal of said said energy source, and the other terminal of said energy source being connected to the base electrodes of said first and second transistors.

7. A circuit as defined in claim 4 wherein said bias means comprises a source of energy having a pair of terminals, a first two-terminal resistive network having one terminal connected to the base electrodes of said first transistor and the other terminal connected to one terminal of said energy source, a second two-terminal resistive network having one terminal connected to the base electrode of said second transistor and the other terminal connected to said one terminal of said energy source, and the other terminal of said energy source being connected to the emitter electrodes of said first and second transistors.

8. The circuit defined in claim 4 wherein said first and second transistors are of the same polarity type.

9. A capacitive tachometer comprising in combination an energy source; a pair of output terminals; a capacitor; means for alternatively connecting one plate of said capacitor to said energy source and to one of said output terminals in response to an input signal; first and second transistors each having emitter, collector and base electrodes; each of said transistors being characterized by a region of low impedance and a region of high impedance between its collector electrode and one of its other electrodes for respectively opposite current flow through its collector electrode; bias means coupled between the base and emitter electrodes of each of said transistors for biasing the emitter and base electrodes of each transistor for establishing a predetermined constant collector current flow for said high impedance region; means connecting together said first and second transistors so that the collector current flow causing one of said transistors to operate as a high impedance causes the other of said transistors to operate as a low impedance; means connecting the other plate of said capacitor to the collector electrode of said first transistor; and means connecting the other of said output terminals to the collector electrode of said second transistor and to said energy source.

10. A capacitive tachometer comprising in combination an energy source; a pair of output terminals; a capacitor; means for alternately connecting one plate of said capacitor to said energy source and to one of said output terminals in response to an input signal, first and second variable impedance devices, biasing means coupled to said first and second variable impedance devices of such magnitude and polarity that the current through said devices in a first direction is limited to a predetermined maximum value, said devices being characterized as high impedance devices for current flow in said first direction, said devices further being characterized as low impedance devices for current flow in a second direction opposite that of said first direction, means for connecting said first variable impedance device to the other plate of said capacitor, means for connecting said second variable impedance device and said energy source to the other of said output terminals, means for connecting said first and second variable impedance devices so as to provide a common current path between said capacitor through said variable impedance devices to said other output terminal, said first and second variable impedance devices being connected so that current flow causing one of said devices to operate as a high impedance causes the other of said devices to operate as a low impedance.

11. A circuit for clamping current magnitudes of both polarities to predetermined maximum values comprising a pulse generator having positive and negative output current pulses, first and second transistors each having emitter, collector and base electrodes; bias means coupled between the base and emitter electrodes of each of said transistors for biasing the base to emitter junction of each transistor so that whenever the collector to emitter junction is reverse biased the collector current is substantially independent of the collector circuit and determined only by the current flow in the base electrode and the transistor characteristics; said transistor being characterized by a low impedance when the collector to emitter junction is forward biased; means connecting the output of said pulse generator to the collector electrode of said first transistor; a load for receiving the clamped current pulses; means connecting said load to the collector electrode of said second transistor; and means connecting together said first and second transistors so that a pulse output from said pulse generator reverse biases the collector to emitter junction of one of said transistors and forward biases the collector to emitter junction of the other of said transistors.

12. Bi-directional constant current apparatus comprising a bi-directional current source, first and second bi-directionally conductive devices series connected across said source, each said device having a high impedance constant current condition and a low impedance condition, bias means operative in response to current from said source in a first direction for causing said first and second devices simultaneously to have high and low impedance conditions respectively, said bias means including means operative in response to current from said source in a second direction for shifting each of said devices into low impedance and high impedance conditions respectively.

13. A circuit for providing a constant-amplitude current in each direction of flow, comprising:
 a pair of transistors, each having at least an emitter and a base and a collector connected in a configuration comprising a connection between the emitters of said transistors with junction of said transistors connected in series;
 means for back-biasing the collector-base junction of one transistor and forward-biasing the collector-base junction of the other transistor to cause one transistor to have a low impedance and to cause the other transistor to have a high impedance, the high-impedance transistor acting as a current-limiting device.

14. The combination of claim 13 wherein said connection comprises two resistances, series-connected to form a junction and said means comprises a direct-voltage source connected between the junction of said resistances and said bases of said transistors—whereby the values of said resistances determine whether the constant-amplitude output current is symmetrical about a zero line.

15. The combination of claim 13 wherein said means comprises a series-connected resistance and direct-voltage source.

16. The combination of claim 13 wherein said means comprises a direct-voltage source having one terminal connected to said connection, and having the other terminal connected to said bases of said transistors through respective resistances.

17. An electrical circuit comprising:
 a source of electrical current,
 a first current controlling means connected in series with said source and providing control of current, flowing therethrough in a first direction, to a substantially constant non-zero magnitude, and having substantially no opposition to the flow of current therethrough in a second direction opposite to said first direction; and
 a second current controlling means, connected in series with said first means, providing control of current flowing therethrough in said second direction to a substantially constant non-zero magnitude, and having substantially no opposition to the flow of current therethrough in said first direction.

18. A circuit as recited in claim 17 and further comprising:
- a capacitor, connected in series with said means;
- an electrical load;
- switching means for alternately connecting said source of electrical current into series connection with said capacitor and said devices to charge said capacitor at a substantially constant current, and connecting said load into series connection with said capacitor and said means to discharge said capacitor at a substantially constant rate; and
- means for controlling the position of said switching means.

19. A circuit as recited in claim 17 in which said electrical current source is an electrical pulse generator.

References Cited by the Examiner

UNITED STATES PATENTS

| | | | |
|---|---|---|---|
| 2,891,171 | 6/59 | Shockley | 307—88.5 |
| 2,891,173 | 6/59 | Helbig | 307—88.5 |
| 2,899,571 | 8/59 | Myers | 307—88.5 |
| 2,907,895 | 10/59 | Van Overbeek | 307—88.5 |
| 2,962,603 | 11/60 | Bright | 307—88.5 |

ARTHUR GAUSS, *Primary Examiner.*

GEORGE N. WESTBY, HERMAN K. SAALBACH, *Examiners.*